April 20, 1948.   R. LEE ET AL   2,439,938
RECTIFIER SYSTEM
Filed Feb. 9, 1943

WITNESSES:

INVENTORS
Reuben Lee and
Charles K. Hooper.
BY
ATTORNEY

Patented Apr. 20, 1948

2,439,938

UNITED STATES PATENT OFFICE 2,439,938

RECTIFIER SYSTEM

Reuben Lee, Catonsville, and Charles K. Hooper, Shipley Heights, Md., assignors to Westinghouse Electric Corporation, East Pittsburgh, Pa., a corporation of Pennsylvania Application February 9, 1943, Serial No. 475,270

4 Claims. (Cl. 175—363)

Our invention relates to alternating-current rectifier systems and, in particular, to arrangements for maintaining constancy of output voltage over a wide range of loads.

One object of our invention is to provide an alternating-current rectifier supplying a direct-current load which shall maintain approximate constancy of output voltage at all loads from full load down to zero load current.

Another object of our invention is to provide alternating-current rectifiers having an appreciable reverse current, such, for example, as copper oxide rectifiers, which will maintain substantial constancy of output voltage from full load current all the way down to zero direct current, and which will function thus without the addition of a bleeder resistance in shunt with the load circuit.

Another object of our invention is to provide an alternating-current rectifier embodying rectifier units having an appreciable reverse current which uses a much smaller bleeder resistance in shunt with the direct-current load than do rectifier arrangements employing rectifiers having an extremely small reverse current.

Still another object of our invention is to provide an alternating-current rectifier which shall maintain substantial constancy of direct-current voltage at all values between zero and full load current, but in which a series inductance in the output filter customarily provided is of smaller current capacity than is the case with arrangements in which a bleeder resistance is used in multiple with the direct-current load.

Other objects of our invention will become apparent from reading the following description taken in connection with the drawing, in which.

The output current of a full-wave single-phase rectifier can be resolved into the sum of a direct current on which is superposed various harmonics of the alternating-current input frequency, the only prominent one of these harmonics being the second. The output voltage can similarly be resolved into a direct-current voltage on which is superposed a second harmonic alternating voltage. The second harmonic ripple in the output current is, in fact, produced by the second harmonic in the output voltage acting upon a series circuit comprising a series inductor, such as 1 in Fig. 1, and the shunt capacitor 2. Since the input voltage to the rectifier is nearly constant in value, this second harmonic in the output current remains nearly constant in value with all loads. It, therefore, happens that when the direct-current load is very small in value, the second harmonic alternating current considerably exceeds the direct current. On the other hand, as when the direct current has increased to a larger value, the second harmonic is much smaller than the direct current and merely constitutes a relatively small ripple floating thereon. It can be shown that as long as this second harmonic alternating current has a maximum value smaller than the average value of the direct current, the output voltage of the rectifier remains nearly constant; this is illustrated by the approximately level portion of the curve in Fig. 2. This portion of the curve is not, strictly speaking, horizontal, but has a slight downward slope, the amount depending on the internal impedance of the rectifier in its conductive direction. On the other hand, when the direct current is smaller than the maximum value of this second harmonic current, the output voltage lies at values, such as those of the dotted portion of Fig. 2, which lies substantially above the horizontal portion just discussed. In other words, as the direct current decreases over the range of values below that at which it equals the alternating second harmonic current, the volt-ampere curve of the rectifier turns rather sharply upward, as indicated by the dotted line in Fig. 2.

Figure 2:
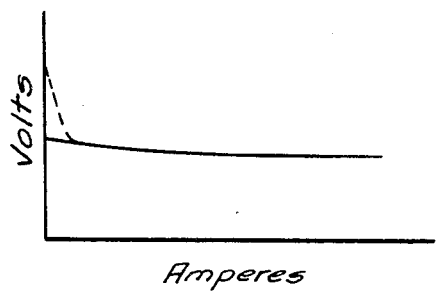
Fig. 2 is a plot of output voltage and current useful in explaining our invention and Fig. 3 is a circuit embodying a different modification of our invention.

The critical value I of direct current at which the sharp change in slope of the output characteristic occurs is given by dividing the second harmonic in the output voltage by the net reactance of the circuit comprising the inductance 1 and the capacitance 2 in Fig. 2. The value is (1) $$I = \frac{E}{4\pi fL - \frac{1}{4\pi fC}}$$

where
$f$ is the frequency of the alternating current supply,
$L$ is the self-inductance of coil 1 of Fig. 2 in henrys, and
$C$ is the capacitance of the capacitor 2 in farads.
$E$ is the second harmonic output voltage.

Figure 1:
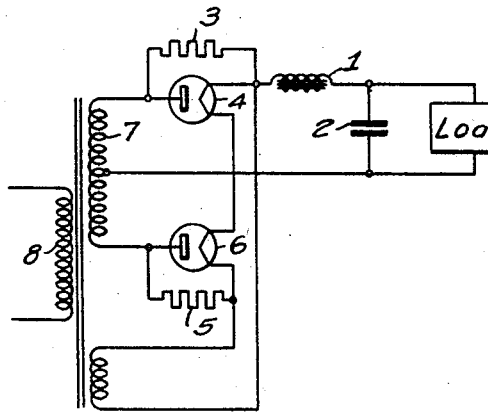
Figure 1 is a circuit embodying one modification of our invention.

For a single-phase full-wave rectifier such as that appearing in Fig. 1, the second harmonic voltage is approximately 67% of the direct-current voltage. For a three-phase full-wave rectifier, the most prominent harmonic voltage, i. e. the third is approximately 5.7% of the direct current voltage. Equation 1 may, accordingly, be expressed for a single phase full wave rectifier as $$(2) \quad I = \frac{0.67 D}{4\pi f L - \frac{1}{4\pi f C}}$$

where D is the direct current output voltage.

We have found that the dotted portion of the output characteristic Fig. 2 may be eliminated and the characteristic follow the full line of Fig. 2 even down to zero current if we provide a resistor 3 in shunt with one rectifier tube 4 and a resistor 5 in shunt with the other rectifier tube 6 of a full-wave rectifier such as is shown in Fig. 1. This rectifier is supplied from the secondary 7 of a transformer having an alternating supply voltage impressed across its primary 8. The cathodes of the two rectifiers 4 and 6 are interconnected and joined through the inductor 1 to the positive terminal of the direct-current load 9. The negative terminal of the direct-current load is connected to the mid point of the secondary winding 7. The capacitor 2 shunts the terminals of the load 9.

We have discovered that the resistors 3 and 5 should each be of such a value that the direct current load voltage D will cause to flow through resistor 5 a current which is substantially equal to one half the value I determined by Equation 2.

Therefore the value of the resistor 5 should be approximately $$(3) \quad \frac{2D}{I} = 37.6 f L - \frac{0.239}{fC}$$

The foregoing has assumed that the rectifiers 4 and 6 conduct current only in one direction and are perfect insulators when the voltage across their terminals is in a reverse direction. Many types of rectifier approximate this condition, but there are certain types, notably the copper oxide and other so-called contact rectifiers, in which an appreciable amount of current flows through the rectifier in its normal non-conductive direction. Such currents are known as reverse currents. It will be obvious that where there is appreciable current flow in the reverse direction through the rectifiers, such current flow will play the same role as current flow through the resistors 5 and 3 just described in connection with the operation of our invention. Therefore, the conductance of the resistors 3 and 5 should be reduced from the value just calculated by an amount equal to the conductance in the reverse direction of the rectifiers they shunt. In some instances, it will be found that the conductance of the rectifiers in the reverse direction, particularly if they are of the copper oxide type, is fully equal to, or greater than, the amount calculated above for the resistors 3 and 5; and in such instances, the resistors 3 and 5 may be omitted.

Since in the case of a three phase rectifier the sixth harmonic voltage is only 5.7 percent of the direct current output voltage the sixth harmonic ripple current is given by $$(4) \quad I_3 = \frac{0.057 D}{12\pi f L - \frac{1}{12\pi f C}}$$

and the value of the resistor shunting each rectifier by $$(5) \quad \frac{3D}{I_3} = 1980 f L - \frac{1.4}{fC}$$

In general, if the alternating current source has $n$ phase-terminals and the prominent harmonic in the voltage at the input end of the inductor is a percent of the direct current load voltage, the value of the resistor to be connected across each phase of the rectifier is $$(6) \quad R = \frac{100 n}{a} \left\{ 2\pi n f L - \frac{1}{2\pi n f C} \right\}$$

where $f$, L and C have the values given in connection with Equation 1.

Figure 3:
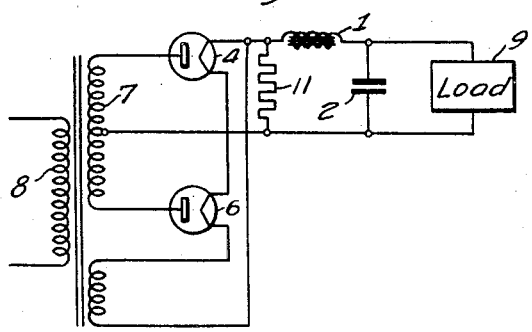

Fig. 3 shows another modification of our invention, in which a resistor capable of conducting current equal in amount to the value I determined by Equation 2 is shunted between the common cathodes of the rectifiers 4 and 6 and the mid point of the winding 7 instead of employing the resistors 3 and 5 of Fig. 2. The resistor 11 in Fig. 3 is thus connected. Since it is to conduct the critical value of current above-described under impulse of a voltage substantially equal to the direct-current voltage of the loads, its value is given by the following equation:

$$(7) \quad \frac{D}{I} = 18.8 f L - \frac{0.120}{fC}$$

In accordance with a practice hitherto known in the art, bleeder resistors have been connected directly across the direct-current load to draw small direct currents and thereby prevent the voltage rise such as is shown by dotted portion of Fig. 2. However, it will be noted that such bleeder risistors may be eliminated by substituting for rectifiers having a substantially zero conductance in their reverse current direction some rectifier such as the copper oxide rectifier which has a substantial conductance in a reverse direction. In accordance with the principles of our invention, the bleeder resistors of the prior art may, accordingly, be eliminated by substituting copper oxide or other rectifiers having reverse current conductance corresponding to Equation 3 for rectifiers of zero reverse conductance.

It will also be noted that where a bleeder resistor is connected directly in shunt with the load, the current supplying it must traverse the inductance 1. On the other hand, in the arrangements in both Figs. 2 and 3, the current flowing through our resistors 3, 5 and 11, respectively, does not flow through the inductance 1. Accordingly, the current-carrying capacity of the inductance 1 may be appreciably reduced over that of prior art inductances by employing our invention.

We claim as our invention:

1. In combination, a source of alternating voltage, a pair of half-wave rectifiers having similar terminals connected respectively to the end terminals of said source, the other terminals of said rectifiers being connected together to a direct-current load circuit through an inductor, a capacitor shunted across said load circuit on the load side of said inductor, and a pair of resistors respectively connected in shunt to the terminals of said rectifiers, each said resistor having a value approximately equal to $$37.6 f L - \frac{0.239}{fC}$$

where $f$ is the frequency of said source, L is the inductance in henrys of said inductor, C is the capacitance in farads of said capacitor.

2. In combination, a source of alternating voltage, a pair of half-wave rectifiers of a type having an appreciable conductance in the reverse current direction connected respectively to the end terminals of said source, the other terminals of said rectifiers being connected together to the positive terminal of the direct-current load, a connection from the negative terminal of said load to the mid tap of said source, an inductor connected in series between said rectifiers and said load, a capacitor shunting said load beyond said inductor, the value of said inductor and said capacitor being related to the resistance R in the reverse direction of each said rectifier substantially by the following equation:

$$R = 37.6fL - \frac{0.239}{fC}$$

where L is the inductance in henrys of said inductor, C is the capacitance in farads of said capacitor, $f$ is the frequeny of said source.

3. In combination with an alternating-current source, a pair of rectifiers having homologous terminals connected respectively to the opposite ends of said source, the other terminals of said rectifiers being connected together to an inductor, the other terminal of said inductor being connected to the positive terminal of a load, a capacitor connected in shunt with said load, a connection from the negative terminal of said load to the mid tap of said source, and a resistor connected between said other terminals of said rectifiers and said mid tap, the value of said resistor being substantially $$18.8fL - \frac{0.120}{fC}$$

where L is the inductance in henrys of said coil, C is the capacitance in farads of said capacitor, $f$ is the frequency of said source.

4. In combination, a source of alternating current having $n$ phase-terminals, a half-wave rectifier connected to deliver current from each phase-terminal to a load circuit through an inductor, a capacitor shunted across said load circuit on the load side of said inductor, a resistor connected across each said rectifier, each resistor having a value of approximately $$\frac{100n}{a}\left\{2\pi nfL - \frac{1}{2\pi nfC}\right\}$$

where $f$ is the frequency of said source, L is the inductance in henrys of said inductor, C is the capacitance in farads of said capacitor, and the most prominent harmonic in the voltage at the input end of the inductor is a percent of the direct current load voltage.

REUBEN LEE.
CHARLES K. HOOPER.

REFERENCES CITED

The following references are of record in the file of this patent:

UNITED STATES PATENTS

| Number | Name | Date |
| --- | --- | --- |
| 1,110,599 | Thomas | Sept. 15, 1914 |
| 1,773,304 | Elderkin | Aug. 19, 1930 |
| 1,878,101 | Bradbury | Sept. 20, 1932 |
| 2,032,914 | Crossley et al. | Mar. 3, 1936 |